(12) United States Patent
Zubas et al.

(10) Patent No.: US 8,594,655 B2
(45) Date of Patent: *Nov. 26, 2013

(54) REMOTE ACTIVATION OF VIDEO SHARE ON MOBILE DEVICES

(71) Applicant: AT&T Mobility II LLC, Atlanta, GA (US)

(72) Inventors: Michael Zubas, Marietta, GA (US); John Lewis, Lawrenceville, GA (US); Jeffrey Mikan, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/691,179

(22) Filed: Nov. 30, 2012

(65) Prior Publication Data

US 2013/0095813 A1 Apr. 18, 2013

Related U.S. Application Data

(63) Continuation of application No. 12/974,588, filed on Dec. 21, 2010, now Pat. No. 8,359,021.

(51) Int. Cl.
*H04M 3/00* (2006.01)

(52) U.S. Cl.
USPC ...... 455/420; 455/414.1; 455/3.03; 455/3.05; 455/519; 455/68; 455/70

(58) Field of Classification Search
None
See application file for complete search history.

(56) References Cited

U.S. PATENT DOCUMENTS

| | | | |
|---|---|---|---|
| 7,904,074 B2 | 3/2011 | Karaoguz et al. | |
| 7,917,082 B2 | 3/2011 | Goldberg et al. | |
| 7,925,288 B2 | 4/2011 | Kim | |
| 8,359,021 B2* | 1/2013 | Zubas et al. | 455/420 |
| 2009/0186596 A1 | 7/2009 | Kaltsukis | |
| 2011/0034121 A1 | 2/2011 | Ng et al. | |

\* cited by examiner

*Primary Examiner* — Willie J Daniel, Jr.
(74) *Attorney, Agent, or Firm* — Woodcock Washburn LLP

(57) ABSTRACT

A method for initiating a video share service of a mobile device based on commands from a remote source. The method includes receiving a request from the remote source to initiate the video share service, authenticating the sender of the request, receiving a command to start the video share service; and transmitting the output of the service. There is also a system configured for receiving a request from a first mobile device to initiate a service from a second mobile device, for authentication of the request, for commanding the second mobile device to start a service under control of the first mobile device, and for delivery of the output of the service.

20 Claims, 8 Drawing Sheets

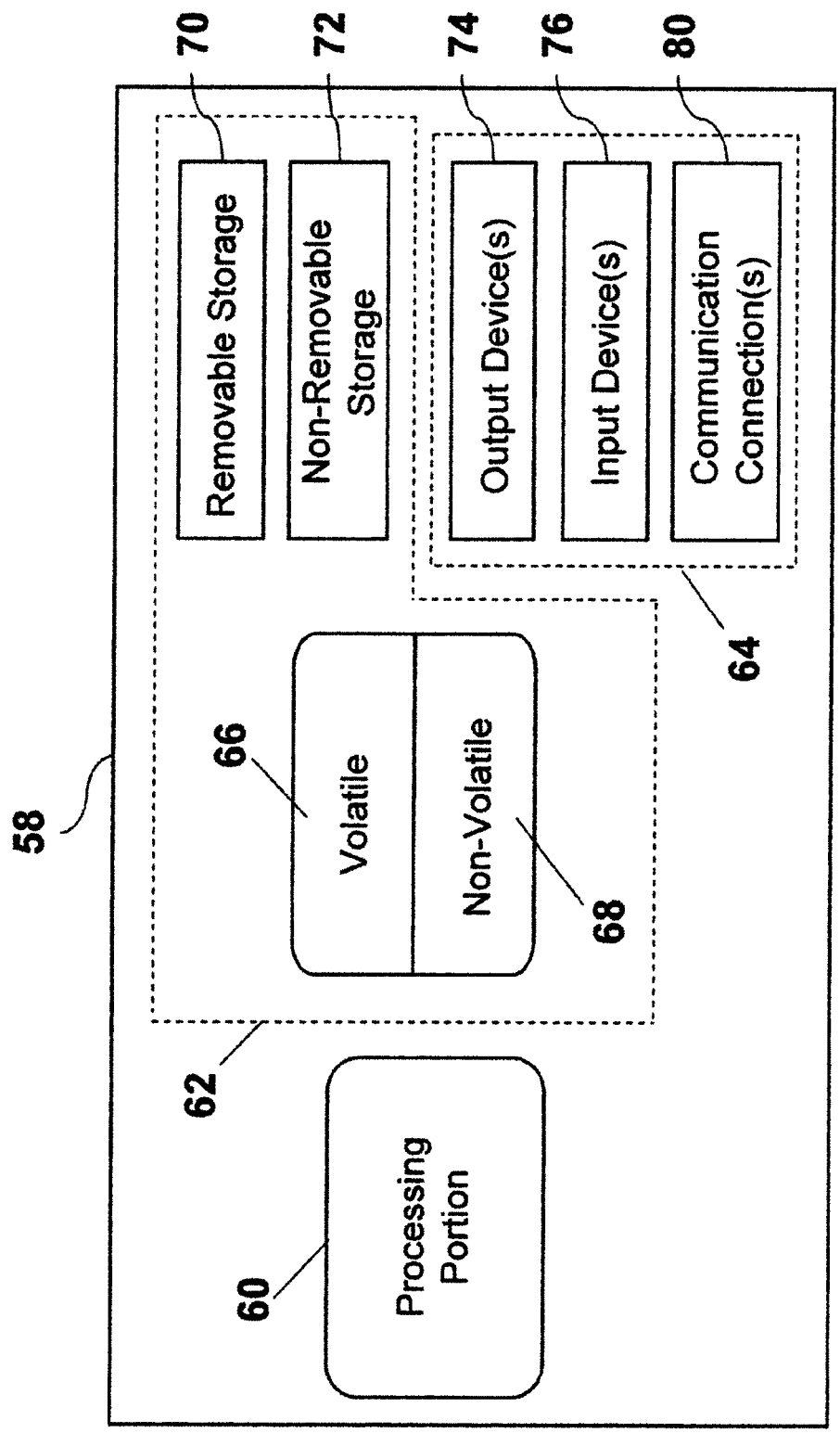

REMOTE ACTIVATION OF VIDEO SHARE ON MOBILE DEVICES

TECHNICAL FIELD

This technical field relates to a system and method for the remote initiation of video and audio functionality in a mobile device.

BACKGROUND

Mobile telecommunications have developed location-based services based on the ability to identify with particular certainty wherein a network a wireless device is located. Service providers have moved beyond location-based services to utilize the location information for other purposes. Currently there exists a family safety feature wherein a parent or other authorized family member is able to obtain location information of their children's whereabouts by tracking the location of their mobile device. This is valuable for parents who want to ensure that their children are where they should be, or if the children are traveling, that the children are safely enroute or have safely arrived. However, that piece of mind only goes so far. While the parents are able to ascertain where the children are located, the parents do not know the conditions of that location.

Mobile telecommunications providers have also developed video share/video streaming products wherein videos are streamed from a server to a subscriber based on a request from the subscriber. It is also possible for a mobile device to stream video from the mobile device to a server under the control of the mobile device. However, the ability to control the streaming of video from a remote location is not possible. Moreover, other functionality of mobile devices which may be advantageous to a parent of supervisor is not able to be controlled remotely Accordingly, there is a need for an added security feature wherein video share and other functionality of a mobile device may be originated remotely.

SUMMARY

The disclosed embodiment includes a method for sharing a remotely originated service from a mobile device, which includes receiving a request from a remote source to initiate a service, authenticating the sender of the request, receiving a command to start the service; and transmitting the output of the service. The service may be video share, and the output may be a video taken by the mobile device. The service may be an audio recording and the output is an audio track taken by the mobile device. The requester may be a user of a second mobile device. and wherein the output is transmitted to the second mobile device or to a remote server for distribution. The method may include the service being started transparently to the user of a mobile device.

There is also disclosed a system configured for receiving a request from a first mobile device to initiate a service from a second mobile device, for authentication of the request, for commanding the second mobile device to start a service under control of the first mobile device, and for delivery of the output of the service. The service may be a video share and the results are delivered to the first mobile device or to a destination processor other than the first mobile device.

In accordance with another embodiment, there is a method for controlling a service operating on a remote mobile device including initiating a request to start the service at the remote mobile device; receiving an acknowledgement that the request is permitted, sending a command to the remote mobile device to initiate the service, and receiving the output of the service. The service may be video share and the output is video originated at the remote mobile device or the service may be video recording and the output is a sample of the video originated from the remote mobile device or the service is an audio recording and the output is audio recorded by the remote mobile device.

There is also disclosed a method for initiating a video share service of a mobile device based on commands from a remote source, including receiving a request from the remote source to initiate the video share service, authenticating the sender of the request, receiving a command to start the video share service, and transmitting the output of the video share service. The output may be transmitted to the remote source, which may be a remote mobile device. Alternatively, the output may be transmitted to a device other than the remote source. There is also disclosed a computer-readable storage medium having stored thereon computer-executable instructions, that when executed, cause a processor to receive a request from a first mobile device to initiate a service from a second mobile device, authenticate the request, command the second mobile device to start a service under control of the first mobile device; and deliver the output of the service. The service may be is video share and the results are delivered to the first mobile device.

There is also disclosed a computer-readable storage medium having stored thereon computer-executable instructions, that when executed, cause a processor to receive a request from a remote source to initiate a video share service, authenticate a sender of the request, receive a command to start the video share service, and transmitting the output of the video share service.

BRIEF DESCRIPTION OF THE DRAWINGS

The following description is better understood when read in conjunction with the appended drawings

FIG. 4 is a block diagram of an example processor for generating a request for and/or receiving a reporting of traffic information;

DETAILED DESCRIPTION OF ILLUSTRATIVE EMBODIMENTS

Figure 1:
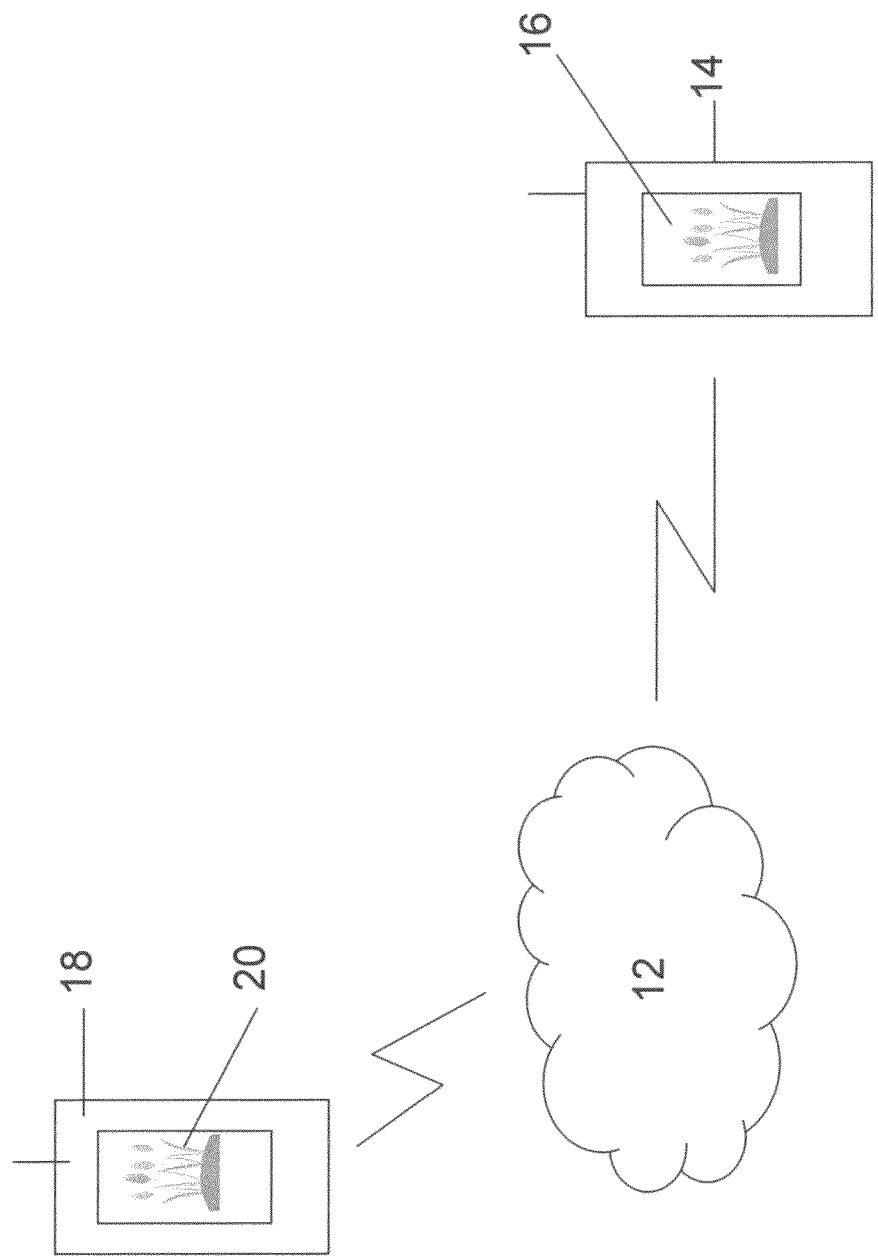
FIG. 1 is a block diagram illustrating a functionality of a disclosed embodiment.

With reference to FIG. 1, there is shown a system 10 in which an embodiment may be illustrated. More particularly, FIG. 1 shows a network 12 which can be any type of wireless or wired network capable of carrying data, including video data. The network 12 may also include the ability to carry voice communications. Network 12 may be GSM, CDMA, WCDMA, 4G, LTE, EDGE, the Internet, Wi-Fi, Wi-Max, and any other type of network. An example network 12 is illustrated in Figures TBD . . . TBD in more detail below. There is also shown mobile devices 14 and 18 in wireless communication with each other through network 12. In an embodiment, the mobile devices 14 and 18 are capable of displaying video data on screens 16 and 20, respectively.

Figure 2:
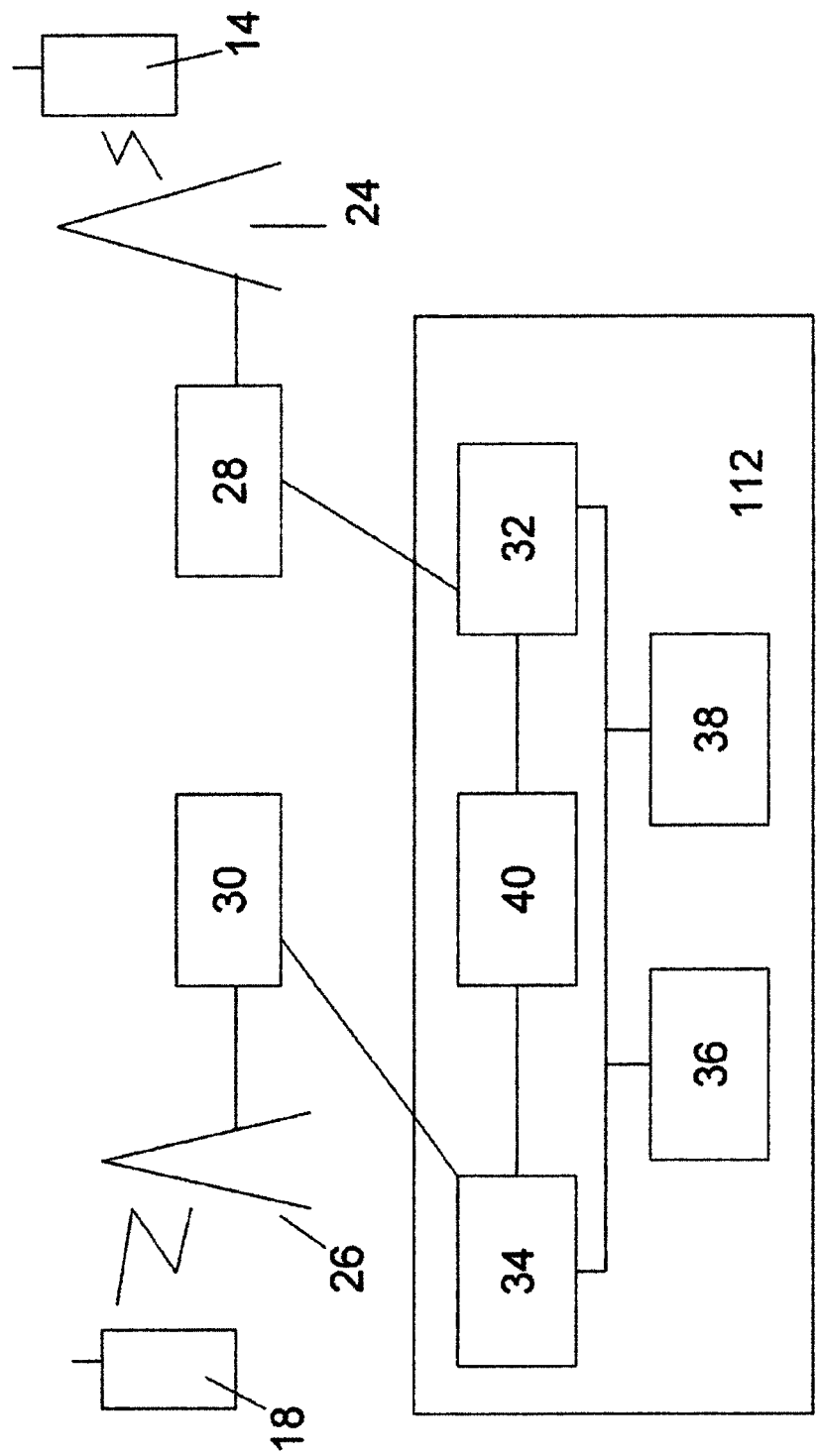
FIG. 2 is a more detailed block diagram of the embodiment in FIG. 1

FIG. 2 shows an embodiment with more network detail than that shown in FIG. 1, in which the video being recorded on mobile device 14 and available to view on screen 16 is also shared with mobile device 18 and available to view on screen 20. Those skilled in the art will understand that if the recording of a picture or a video and transfer of that picture or video are initiated by the user of the mobile device 14, there are known methods for sending that picture or video to a user of a second mobile device 18. In FIG. 2, certain components of network 12 in FIG. 1 are shown in functional block diagram form. It will be understood by those skilled in the art that other network components may be involved in the system and the practicing of the methods associated with the embodiment. Mobile devices 14 and 18 communicate with base stations 24 and 26, respectively, which in turn communicate with base station controllers 28 and 30, respectively. The base station controllers 28 and 30 are connected to mobile switches 32 and 34, with other network components connected thereto. For purposes of illustration only and with reference to FIG. 2, the video sharing functionality may, for example, be performed at least in part by a video server 36 located within network 112 and photo sharing may be performed at least in part by multimedia server 38.

There is also shown an application server 40 in network 112. In the exemplary embodiment in which remote initiation of video share is described, mobile device 14 will be referred to as the local mobile device 14 and mobile device 18 will be referred to as the remote mobile device 118. The camera functions on the local mobile device 14 will be initiated and controlled from the remote mobile device 18. To accomplish this, application server 40 in communication with each mobile device may be used. The application server 40 may receive a request from the remote mobile device 18 to initiate a remote video share session. The application server may then authenticate and validate the user of the remote mobile device 18 and then communicate with the client software residing on local mobile device 14. The client software may, for example, be a downloadable application or could be built in to the device, either as preloaded software, firmware, or built-in chip functionality.

While any mobile device type may be utilized, 3G or LTE handsets may provide better functionality. Smartphones such as the Apple iPhone® or Android-based handsets may, for example, be used, but the embodiments are not limited to such. When activated by the remote mobile device 18, the local mobile device 14 may start recording video and audio and streaming or recording that video and audio to remote mobile device 18 or any other device as directed by remote mobile device 18, the application server 40, or the client software on the local mobile device 14.

Figure 3A:
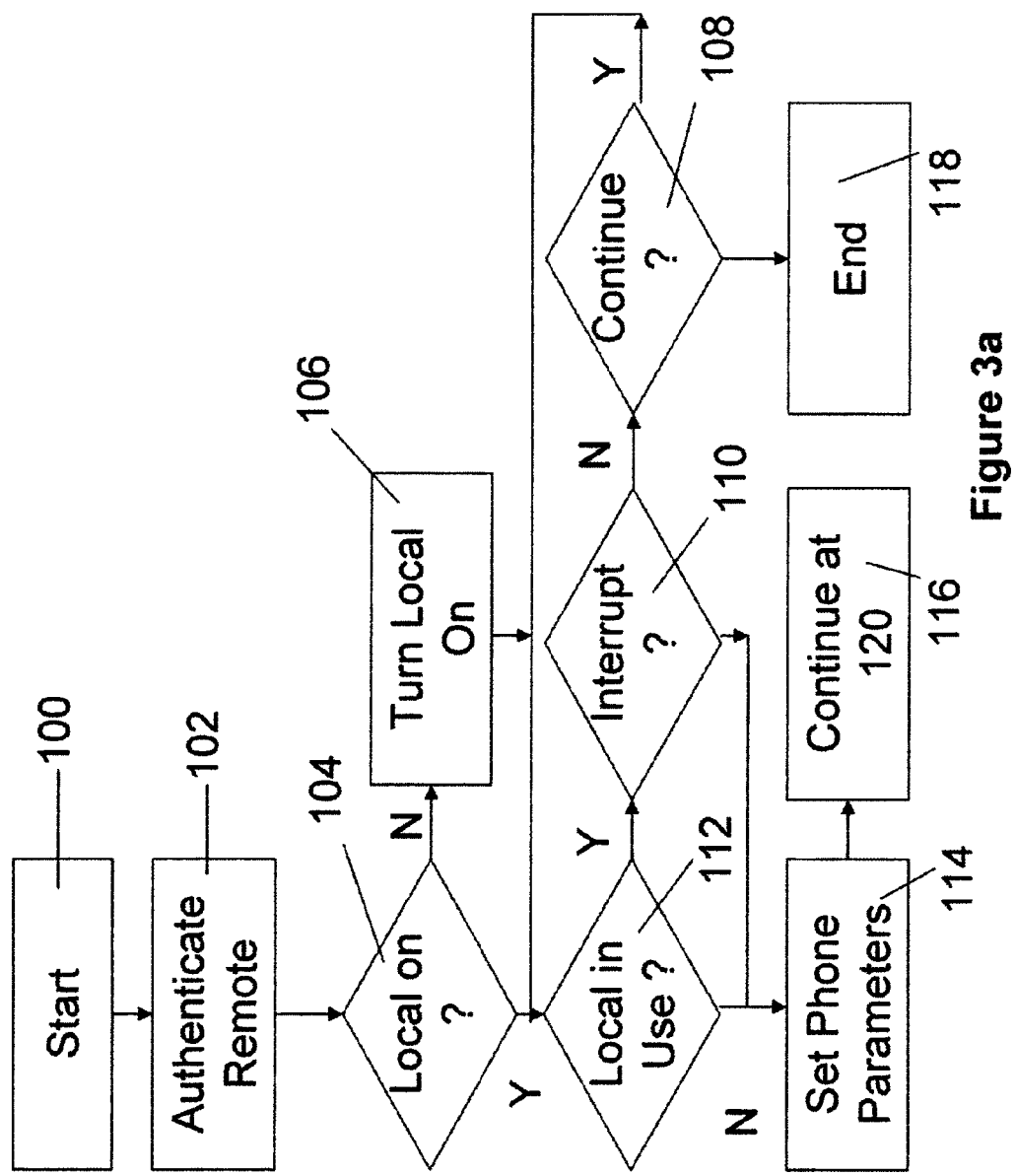
FIGS. 3a and 3b illustrate a flow chart illustrating an embodiment of a method
Figure 3B:
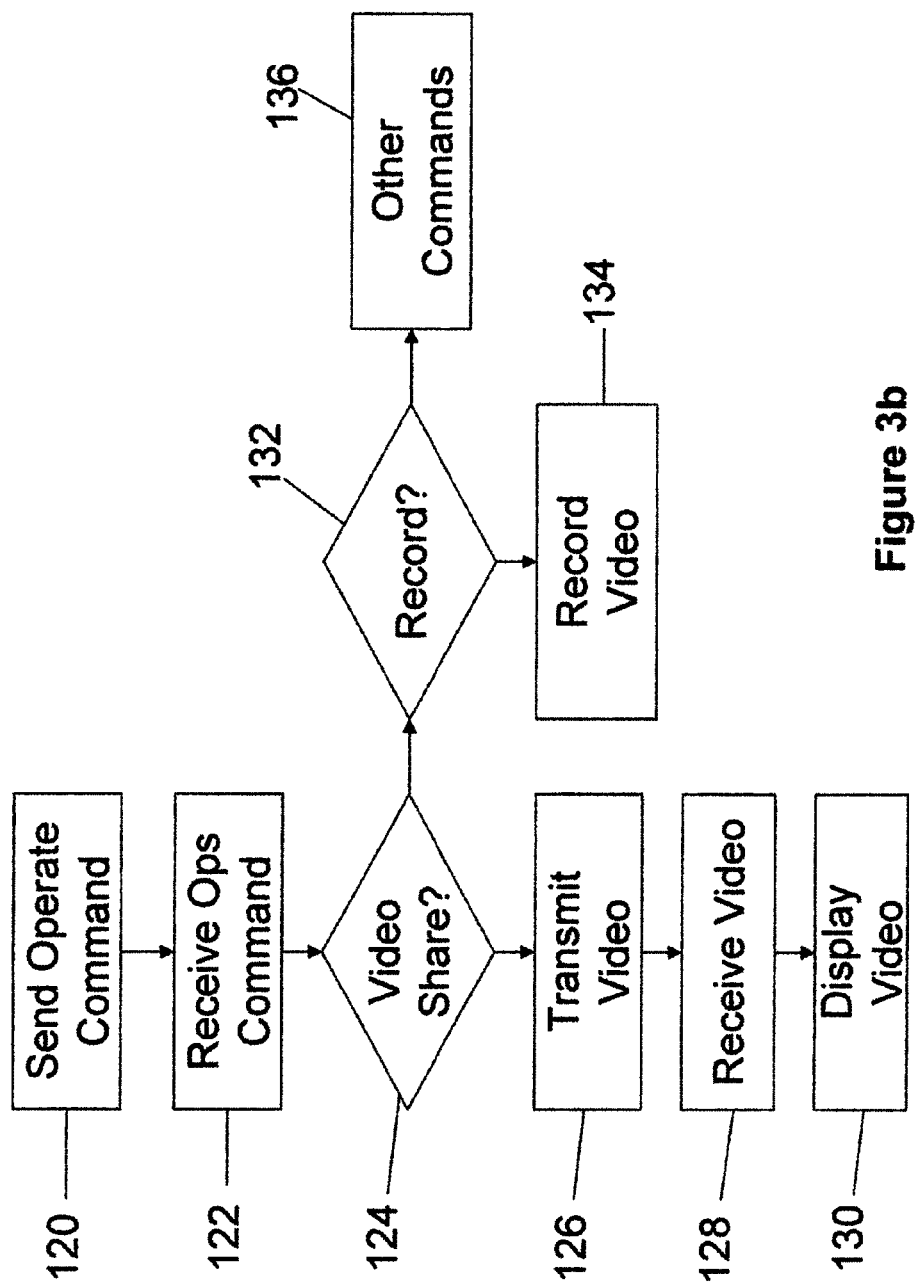

With reference to FIGS. 3a and 3b, there is shown a flow diagram illustrating an embodiment of the method. The method starts at 100 in which the remote mobile device sends a request to application server 40. Application server 40 performs the validation and authentication functions at 102 and then initiates communication with the client software in the local mobile device 14. The application server determines whether the local mobile device 14 is turned on at 104. If not, the local mobile device 16 is turned on remotely at 106. Once the local mobile device 16 is confirmed to be powered on, a query is made at 112 as to whether the local mobile device 16 is in use. If not, the parameters of the local mobile device 16 are set at 114. Those parameters, may for example, be to turn the screen display of the local mobile device 16 off or to turn off the volume or speakers of the local mobile device 16. Such functionality may, for example, be accomplished through a WAP push or MMS wake-up and may be transparent to the user of the local mobile device 16. If the local mobile device 16 is in use, then the query is made at 110 whether to interrupt the call. If yes, then the parameters of the local mobile device 16 are set at 114. If not, then the decision as to whether to continue to monitor the use of the local mobile device 16 is made at 108. If the monitoring is to continue, the process loops back to 112 and continues from there. If the monitoring is not to continue, the process ends at 118.

Once the phone parameters are set, the process continues at 116 to 120 in FIG. 3b. At 120, the remote mobile device 18 sends a request to the client software in the local mobile device 14. The message may be an SMS message, a USSD message, an IP message, a SIP initiation request message or any other type of data communications between the two handsets and it will be understood by those skilled in the art that the network components for sending such messages are known and are included in the exemplary detailed network descriptions of FIGS. 5 to 7. Such messaging may also use in-band signaling through, for example, DTMF tones, if a voice path to between the mobile devices is established. At 122, the local mobile device 16 parses the received command. It is noted that any commands with respect to the audio or video or photographic functions that the local mobile device 16 is capable of initiating locally may be received from the remote mobile device 18. For example, remote commands from remote mobile device 18 may be received and may include commands to turn on/off audio and/or video capability; zoom, record, transfer video via the video share server 36, and any other command to control the functionality of the local mobile device. The local mobile device 16 interprets the command to see if the command is for video share 124, and if not, whether the video was to be recorded at 132 or some other command at 136. At 126, the local mobile device 16 executes the received command, in this example, to initiate video sharing with remote mobile device 18 as transmitted through video share server 36 to remote mobile device 18. At 128, the video is received and displayed on remote mobile device 18 at 130. If the video is to be recorded, it is done so at 134. It will be understood that in lieu of video, an audio recording may be started and shared in a similar fashion, as may still photographs.

In accordance with another embodiment, the local mobile device 14 may override the commands from the remote mobile device 18. For example, there may be multiple prioritization levels. In a case where there are three prioritization levels, such prioritization levels may signify to the local mobile device 14 to use any available bandwidth to transmit video data, to share the total bandwidth, or to give access to the entire bandwidth to the transmission of video data. This may be configurable at the application level.

It will be understood by those skilled in the art that variations of the embodiment are within the scope of the amended claims. For example, either an audio or video path could be opened remotely. Additionally, the speaker phone may be activated remotely and to maintain transparency to the user of the local mobile device 14, the speaker volume may be minimized.

Other commands other than video share commands may be sent from the remote mobile device 18. The remote mobile device 18 may initiate a 3-way call so that video and or audio sharing is established among three devices. The remote mobile device 18 may also designate a server or other source address to receive the video share information. There may be an auto-record option that is initiated from the network or either of the mobile devices. As an alternative to streaming video or audio, the record capability may be used and then download or transfer snapshots periodically of the video or audio periodically. In such a case, looping through the memory of the local mobile device 14 and sending periodic updates or updates on command is possible. Such updates may be controlled from the application server 40 on the network 12 or from the remote mobile device 18.

From a security perspective or for other applications, location functionality may be added to the video or audio which sends the location from the local mobile device 14 to the application server 40 to the remote mobile device 18, with the reverse path also possible. There may also be commands to retrieve call history from the local mobile device 14.

FIG. 4 is a block diagram of an example processor 58 for generating a request for and/or receiving a report for traffic information which may be found in an exemplary mobile device 26. It is emphasized that the block diagram depicted in FIG. 3 is exemplary and not intended to imply a specific implementation. Thus, the processor 58 can be implemented in a single processor or multiple processors. Multiple processors can be distributed or centrally located. Multiple processors can communicate wirelessly, via hard wire, or a combination thereof.

The processor 58 comprises a processing portion 60, a memory portion 62, and an input/output portion 64. The processing portion 60, memory portion 62, and input/output portion 64 are coupled together (coupling not shown in FIG. 3) to allow communications there between. The input/output portion 64 is capable of providing and/or receiving components utilized to generate a request for and/or receiving a report of traffic information as outlined above. For example, as described above, the input/output portion 64 is capable of generating a request for and/or receive a report of traffic information, a request to a database for determining the history of traffic information, alert messages regarding traffic information with or without free form text or characters, or a combination thereof. The processing portion 60 is capable of parsing and analyzing a received alert message, generating a request for and/or receiving a report of traffic information, or a combination thereof, as described above.

The processor 58 can be implemented as a client processor and/or a server processor. In a basic configuration, the processor 58 can include at least one processing portion 60 and memory portion 62. The memory portion 62 can store any information utilized in conjunction with requesting and/or generating reports related to traffic information. Depending upon the exact configuration and type of processor, the memory portion 62 can be volatile (such as RAM) 66, non-volatile (such as ROM, flash memory, etc.) 68, or a combination thereof. The processor 58 can have additional features/ functionality. For example, the processor 58 can include additional storage (removable storage 70 and/or non-removable storage 72) including, but not limited to, magnetic or optical disks, tape, flash, smart cards or a combination thereof. Computer storage media, such as memory portion 62, 70, 72, 66, and 68, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 58. Any such computer storage media can be part of the processor 58.

The processor 58 can also contain communications connection(s) 80 that allow the processor 58 to communicate with other devices, for example. Communications connection (s) 80 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 58 also can have input device(s) 76 such as keyboard, mouse, pen, voice input device, touch input device, etc. Output device(s) 74 such as a display, speakers, printer, etc. also can be included.

The following description sets forth some exemplary telephony radio networks and non-limiting operating environments in which predetermined emergency alert messages can be implemented. The below-described operating environments should be considered non-exhaustive, however, and thus the below-described network architectures merely show how the functionality of the embodiment can be incorporated into existing network structures and architectures. It can be appreciated, however, that the functionality of the embodiment can be incorporated into existing and/or future alternative architectures for communication networks as well, including without limitation, 3G, WCDMA, and 4G/LTE.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of EAS channel assignment can be applied independently of the method for data transport, and do not depend on any particular network architecture, or underlying protocols.

Figure 5:
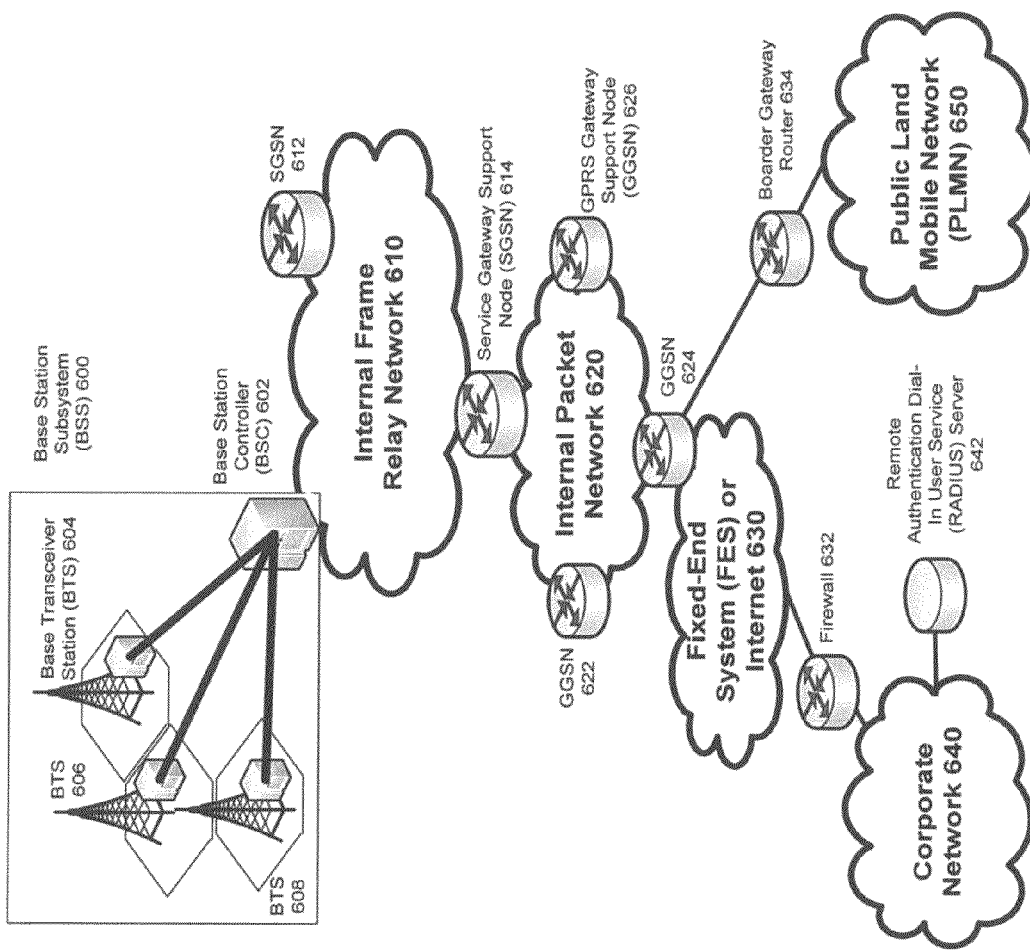
FIG. 5 depicts an overall block diagram of an exemplary packet-based mobile cellular network environment, such as a GPRS network

FIG. 5 depicts an overall block diagram of an exemplary packet-based mobile cellular network environment, such as a GPRS network, in which the system for implementing predetermined emergency alert messages can be practiced. In an example configuration, the cellular radio network 34 and towers 36 are encompassed by the network environment depicted in FIG. 5. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., mobile device 12) become connected to the wireless network. In exemplary fashion, the packet traffic originating from user devices (e.g., user device 60) is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via border gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 6:
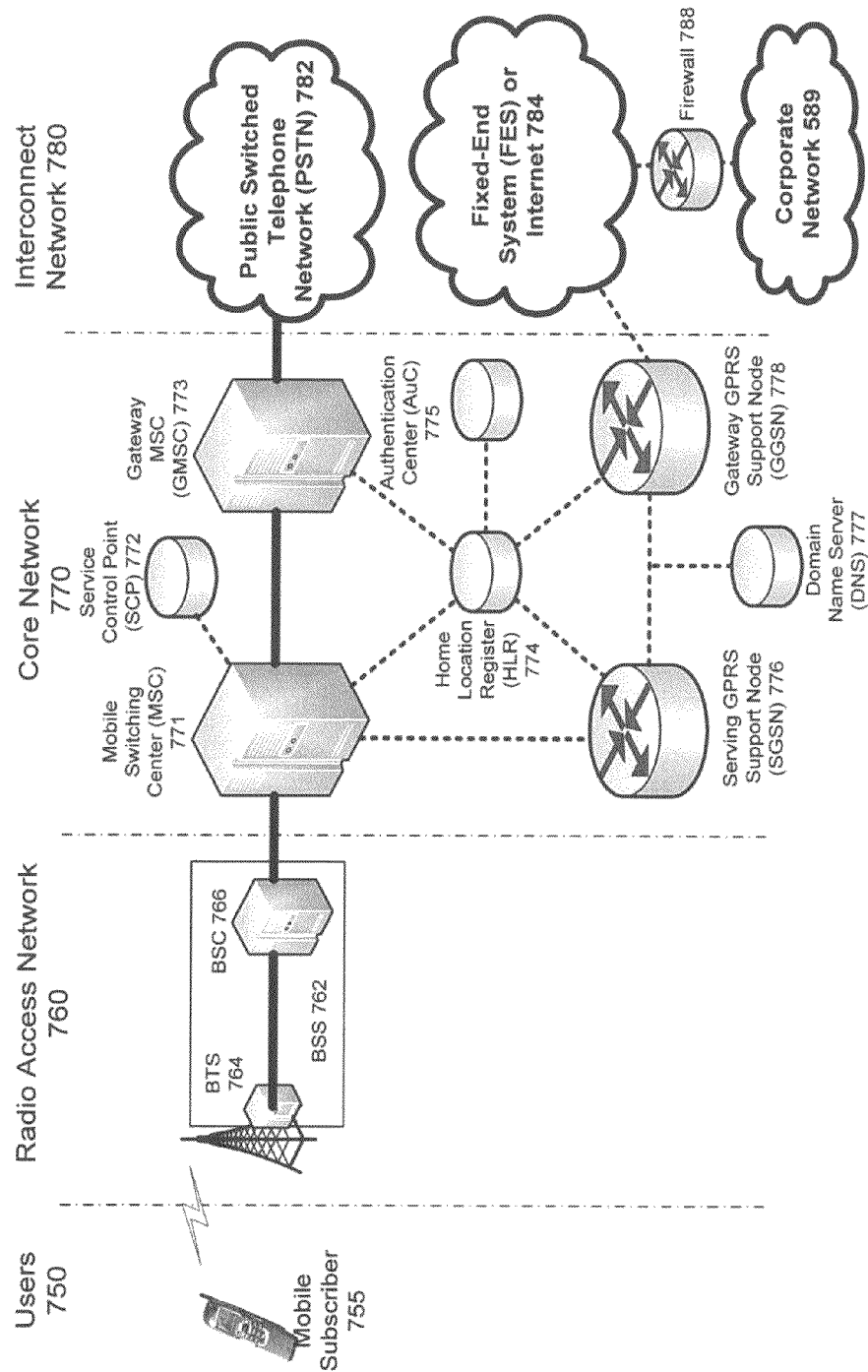
FIG. 6 illustrates an architecture of a typical GPRS network as segmented into four groups.

FIG. 6 illustrates an architecture of a typical GPRS network as segmented into four groups: users 750, radio access network 760, core network 770, and interconnect network 780. In an example configuration the emergency alert network 110, and the wireless broadcast network 116 are encompassed by the radio access network 760, core network 770, and interconnect network 780. Users 750 comprise a plurality of end users (though only mobile subscriber 755 is shown in FIG. 6). In an example embodiment, the device depicted as mobile subscriber 755 comprises mobile device 12. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 6, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the mobile device 12, used by an end user of the mobile cellular service. When a mobile subscriber turns on his or her mobile device, the mobile device goes through an attach process by which the mobile device attaches to an SGSN of the GPRS network. In FIG. 6, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 6) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of predetermined emergency alert messages can include but are not limited to Gateway GPRS Support Node tables, Fixed End System router tables, firewall systems, VPN tunnels, and any number of other network elements as required by the particular digital network.

Figure 7:
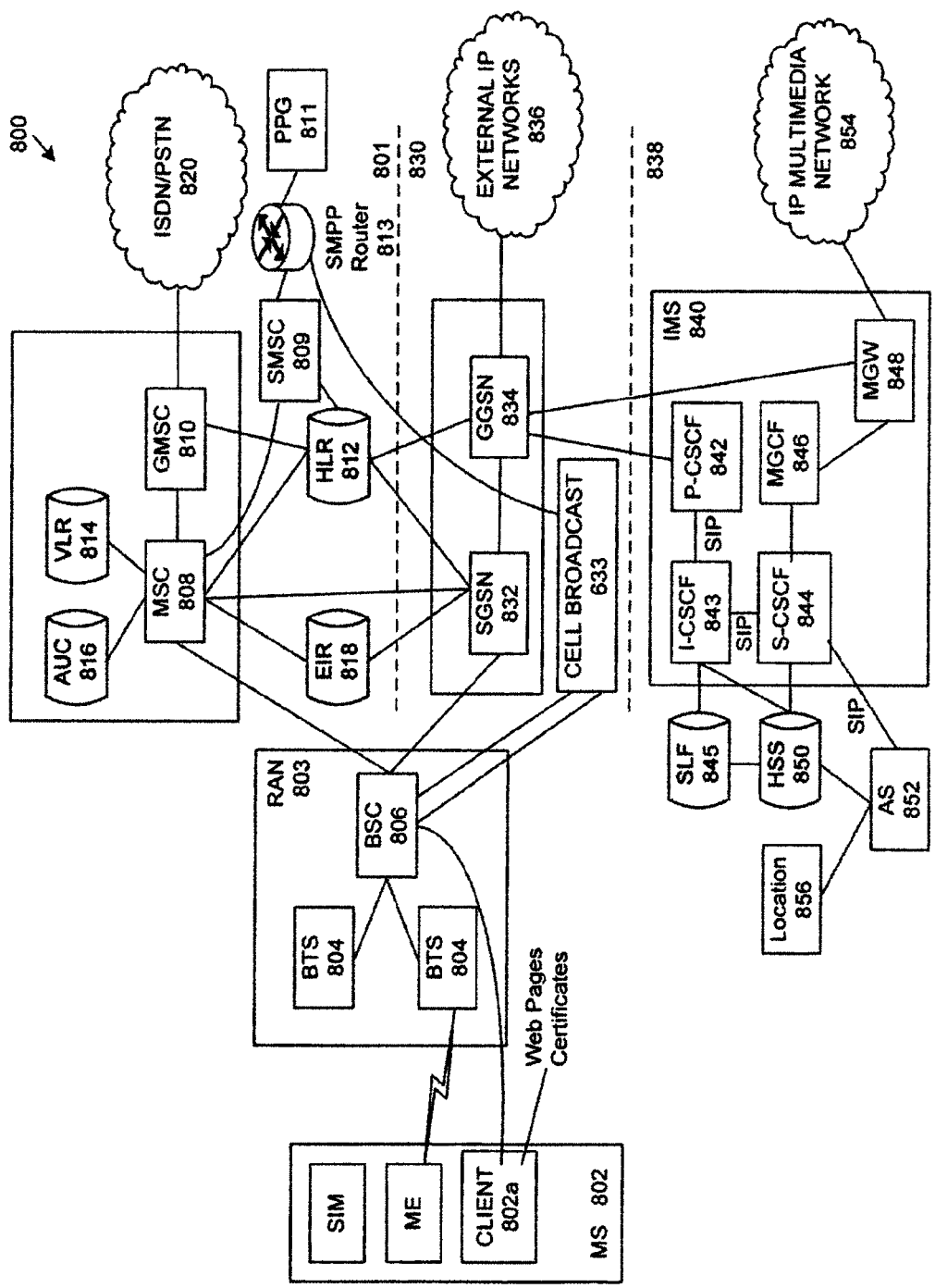
FIG. 7 illustrates an example alternate block diagram of an exemplary GSM/GPRS/IP multimedia network architecture.

FIG. 7 illustrates another exemplary block diagram view of a GSM/GPRS/IP multimedia network architecture 800 in which predetermined emergency alert messages can be incorporated. As illustrated, architecture 800 of FIG. 7 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., mobile device 12) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel In a NOM3 network, a MS can monitor pages for a circuit switched network while received data and vice versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of managed data channels have been described in connection with various computing devices, the underlying concepts can be applied to any computing device or system capable of access wireless data networks. The various techniques described herein can be implemented in connection with hardware or software or, where appropriate, with a combination of both. Thus, the methods and apparatus for managing data rates in mobile networks, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing the embodiments disclosed herein. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations. As described herein, a computer-readable storage medium is an article of manufacture.

While remote control of video and audio share functionality has been described in connection with the various embodiments of the various figures, it is to be understood that other similar embodiments can be used or modifications and additions can be made to the described embodiment for performing the same function of remotely initiating and controlling video and audio share functionality without deviating therefrom. Therefore, remote video and audio share functionality should not be limited to any single embodiment, but rather should be construed in breadth and scope in accordance with the appended claims.

What is claimed:

1. A remote user device comprising a processor; and memory coupled to the processor, the memory comprising instruction that when executed by the processor cause the processor to effectuate operations comprising:
   initiating a content share service;
   determining if a local user device is powered on;
   in response to determining that the local user device is not powered on, then providing instructions indicative of remotely powering on the local user device;

in response to determining that the local user device is powered on, then receiving by the remote user device content of the content share service, the content of the content share service being indicative of being provided by the local user device; wherein after, in response to determining that the local user device is powered on, then determining if the local user device is in use, and if the local user device is in use, then querying whether to interrupt the use of the local user device, and if the local user device is not in use, then providing instructions to set parameters of the local user device.

2. The remote user device of claim 1, wherein the content share service comprises video share, and the content comprises video indicative of being taken by the local user device.

3. The remote user device of claim 2, wherein the video indicative of being taken by the local user device comprises streaming video.

4. The remote user device of claim 1, wherein the content share service comprises audio recording, and the content received by the remote user device comprises an audio track indicative of having been taken by the local user device.

5. The remote user device of claim 1, wherein the remote user device comprises a mobile device.

6. The remote user device of claim 5, wherein the local user device comprises a mobile device.

7. The remote user device of claim 1, wherein the content share service comprises one or more of a video share, photo share, and audio share service.

8. A method comprising:
employing a remote user device comprising a processor; and memory coupled to the processor, the memory comprising instruction that when executed by the processor cause the processor to effectuate operations comprising:
initiating a content share service;
determining if a local user device is powered on;
in response to determining that the local user device is not powered on, then providing instructions indicative of remotely powering on the local user device;
in response to determining that the local user device is powered on, then receiving by the remote user device content of the content share service, the content of the content share service being indicative of being provided by the local user device; wherein after, in response to determining that the local user device is powered on, then determining if the local user device is in use, and if the local user device is in use, then querying whether to interrupt the use of the local user device, and if the local user device is not in use, then providing instructions to set parameters of the local user device.

9. The method of claim 8, wherein the content share service comprises video share, and the content comprises video indicative of being taken by the local user device.

10. The method of claim 9, wherein the video indicative of being taken by the local user device comprises streaming video.

11. The method of claim 8, wherein the content share service comprises audio recording, and the content received by the remote user device comprises an audio track indicative of having been taken by the local user device.

12. The method of claim 8, wherein the remote user device comprises a mobile device.

13. The method of claim 12, wherein the local user device comprises a mobile device.

14. The method of claim 8, wherein the content share service comprises one or more of a video share, photo share, and audio share service.

15. A computer-readable storage medium that is not a propagating signal and having stored thereon computer-executable instructions, that when executed, cause a processor of a remote user device to effectuate operations comprising:
initiating a content share service;
determining if a local user device is powered on;
in response to determining that the local user device is not powered on, then providing instructions indicative of remotely powering on the local user device;
in response to determining that the local user device is powered on, then receiving by the remote user device content of the content share service, the content of the content share service being indicative of being provided by the local user device; wherein after, in response to determining that the local user device is powered on, then determining if the local user device is in use, and if the local user device is in use, then querying whether to interrupt the use of the local user device, and if the local user device is not in use, then providing instructions to set parameters of the local user device.

16. The computer-readable storage medium of claim 15, wherein the content share service comprises video share, and the content comprises video indicative of being taken by the local user device.

17. The computer-readable storage medium of claim 16, wherein the video indicative of being taken by the local user device comprises streaming video.

18. The computer-readable storage medium of claim 15, wherein the content share service comprises audio recording, and the content received by the remote user device comprises an audio track indicative of having been taken by the local user device.

19. The computer-readable storage medium of claim 15, wherein the remote user device comprises a mobile device.

20. The computer-readable storage medium of claim 15, wherein the content share service comprises one or more of a video share, photo share, and audio share service.

* * * * *